United States Patent
Sugiyama (10) Patent No.: US 12,044,909 B2
(45) Date of Patent: Jul. 23, 2024

(54) OPTICAL DEVICE THAT INCLUDES OPTICAL MODULATOR, AND OPTICAL TRANSCEIVER

(71) Applicant: Fujitsu Optical Components Limited, Kawasaki (JP)

(72) Inventor: Masaki Sugiyama, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 87 days.

(21) Appl. No.: 17/391,185

(22) Filed: Aug. 2, 2021

(65) Prior Publication Data

US 2022/0082876 A1  Mar. 17, 2022

(30) Foreign Application Priority Data

Sep. 14, 2020 (JP) .................................. 2020-153461

(51) Int. Cl.
*G02F 1/035* (2006.01)
*G02F 1/21* (2006.01)

(52) U.S. Cl.
CPC .............. *G02F 1/035* (2013.01); *G02F 1/212* (2021.01)

(58) Field of Classification Search
CPC ......... G02F 1/035; G02F 1/212; G02F 1/2255
See application file for complete search history.

(56) References Cited

U.S. PATENT DOCUMENTS

| | | | | |
|---|---|---|---|---|
| 6,287,903 | B1* | 9/2001 | Okuno | H01L 29/66477 |
| | | | | 257/E21.409 |
| 11,287,720 | B2* | 3/2022 | Hayashi | G02F 1/2255 |
| 2010/0034496 | A1 | 2/2010 | Oikawa et al. | |
| 2013/0039612 | A1* | 2/2013 | Sugiyama | G02F 1/2255 |
| | | | | 385/2 |
| 2013/0243363 | A1* | 9/2013 | Sugiyama | G02F 1/035 |
| | | | | 385/2 |
| 2014/0010493 | A1 | 1/2014 | Kondo et al. | |
| 2020/0041824 | A1* | 2/2020 | Ohmori | G02F 1/225 |

FOREIGN PATENT DOCUMENTS

| | | |
|---|---|---|
| JP | H04-159515 A | 6/1992 |
| JP | 2004-133311 A | 4/2004 |
| JP | 2008-250080 A | 10/2008 |
| JP | 2020-020953 A | 2/2020 |
| WO | 2012/124830 A1 | 9/2012 |

OTHER PUBLICATIONS

Office Action dated Dec. 12, 2023 issued in counterpart JP application No. 2020-153461 with English translation. (8 pages).

* cited by examiner

*Primary Examiner* — Tina M Wong
(74) *Attorney, Agent, or Firm* — WHDA, LLP (57) ABSTRACT

An optical device includes an optical modulator formed on a substrate. The optical device includes: a signal electrode for the optical modulator that is formed on the substrate; a ground electrode for the optical modulator that is formed on the substrate; an optical waveguide that is provided in a region between the signal electrode and the ground electrode; a first buffer region that is formed between the optical waveguide and the substrate; and second buffer regions that are formed between the optical waveguide and the signal electrode and between the optical waveguide and the ground electrode. A permittivity of the second buffer regions is higher than a permittivity of the first buffer region.

8 Claims, 10 Drawing Sheets

FIG. 1  Related Art

Related Art

OPTICAL DEVICE THAT INCLUDES OPTICAL MODULATOR, AND OPTICAL TRANSCEIVER

CROSS-REFERENCE TO RELATED APPLICATION

This application is based upon and claims the benefit of priority of the prior Japanese Patent Application No. 2020-153461, filed on Sep. 14, 2020, the entire contents of which are incorporated herein by reference.

FIELD

The embodiments discussed herein are related to an optical device that includes an optical modulator, and an optical transceiver.

BACKGROUND

Figure 1:
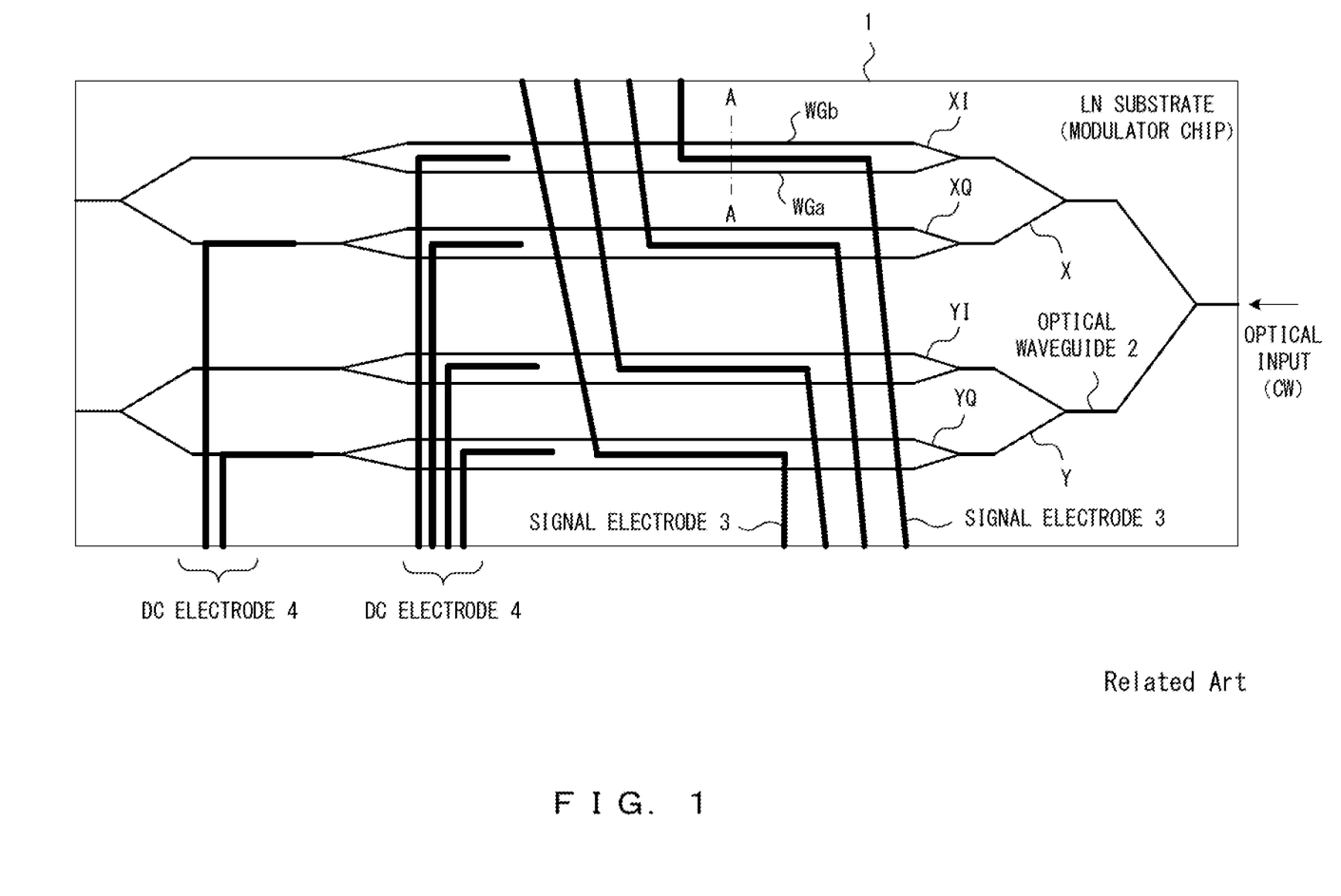
FIG. 1 illustrates an example of an optical device that includes an optical modulator.

FIG. 1 illustrates an example of an optical device that includes an optical modulator. In this example, the optical modulator generates a polarization multiplexed optical signal. In this regard, the optical modulator includes a pair of parent Mach-Zehnder interferometers X and Y. Each of the parent Mach-Zehnder interferometers X and Y includes a pair of Mach-Zehnder interferometers. Accordingly, the optical modulator includes four Mach-Zehnder interferometers XI, XQ, YI, and YQ. Each of the Mach-Zehnder interferometers XI, XQ, YI, and YQ may be operated as an optical modulator when an electric signal is supplied.

The optical modulator is formed using a LiNbO3 (LN) substrate 1. In this regard, each of the Mach-Zehnder interferometers is configured by forming an optical waveguide 2 in a surface region of the LN substrate 1.

The optical modulator includes signal electrodes 3, DC electrodes 4, and ground electrodes. The signal electrode 3 is provided for each of the Mach-Zehnder interferometers XI, XQ, YI, and YQ. Each of the signal electrodes 3 is supplied with an RF signal indicating transmission data. The RF signal may be generated by a digital signal processor (not illustrated). Descriptions of the DC electrode 4 are omitted herein. The ground electrodes are formed within regions on the surface of the LN substrate 1 where neither the signal electrodes 3 nor the DC electrodes are formed. The ground electrodes are electrically connected to a GND. Note that the ground electrode is omitted in the drawing for visibility.

Figure 2:
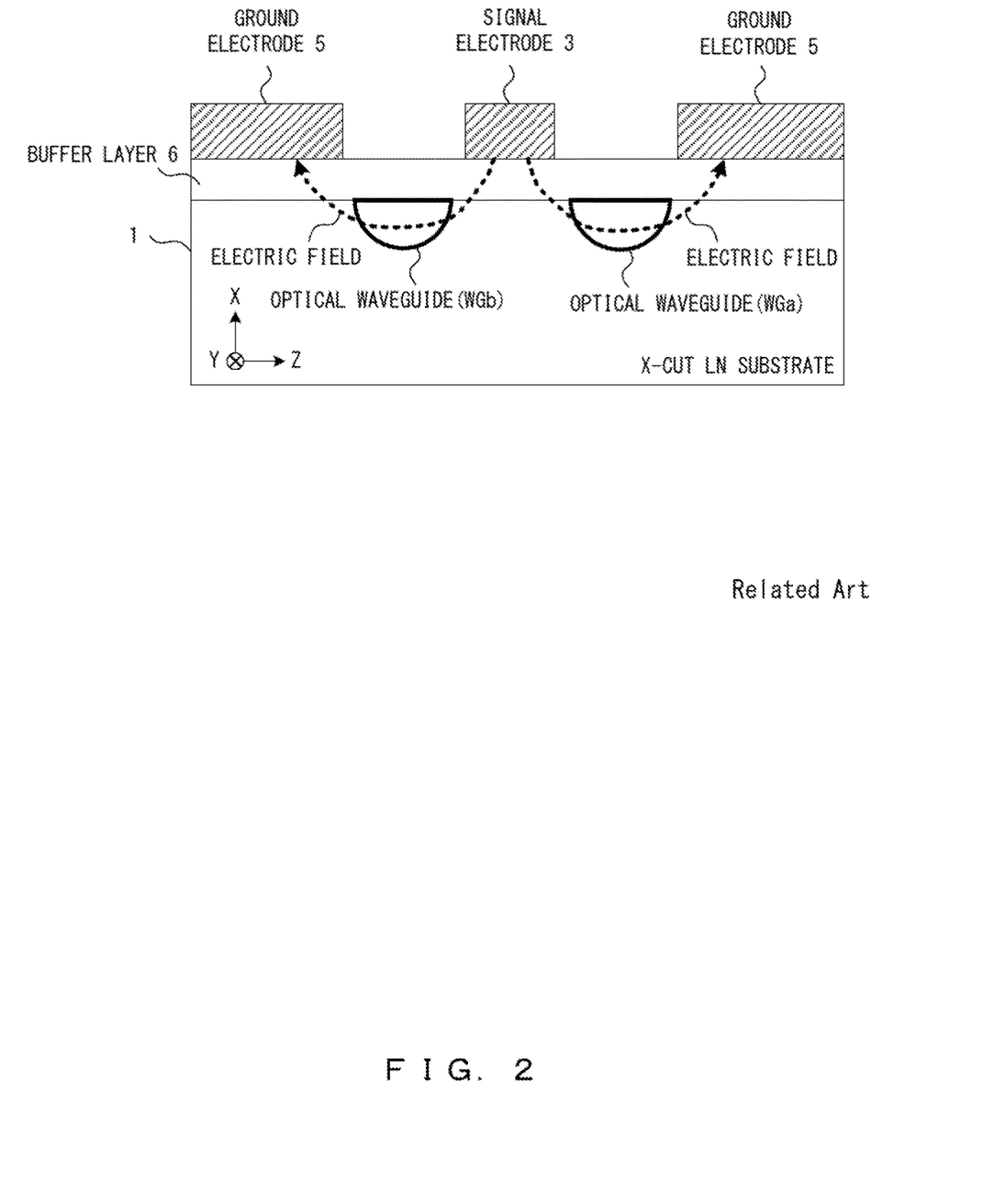
FIG. 2 illustrates an example of a conventional optical modulator.

FIG. 2 illustrates an example of a conventional optical modulator. FIG. 2 depicts any one of the four child modulators of the optical modulator illustrated in FIG. 1 (i.e., any one of Mach-Zehnder interferometers XI, XQ, YI, and YQ). For example, FIG. 2 may indicate an A-A cross section of the child modulator XI illustrated in FIG. 1.

As depicted in FIGS. 1 and 2, the optical modulator includes a pair of optical waveguides WGa and WGb that form a Mach-Zehnder interferometer, a signal electrode 3, and ground electrodes 5. The optical waveguides WGa and WGb are implemented by a coplanar waveguide (CPW). In this example, the coplanar waveguide is configured from two linear or line-like conductors formed parallel to each other (i.e., WGa and WGb).

In the example depicted in FIG. 2, the LN substrate 1 is a X-cut LN substrate. The signal electrode 3 is formed over a region between the pair of optical waveguides forming the Mach-Zehnder interferometer. In the example depicted in FIG. 2, the signal electrode 3 is formed over a region between the optical waveguides WGa and WGb. Meanwhile, the ground electrode 5 are formed within other regions on the surface of the LN substrate 1. Thus, the signal electrode 3 and each of the ground electrode 5 are formed such that a corresponding optical waveguide is placed between them. In other words, an optical waveguide is disposed within a region between the signal electrode 3 and the ground electrode 5. Note that a buffer layer 6 such as an oxide film is formed on the surface of the LN substrate 1, and the signal electrode 3 and the ground electrode 5 are formed on the surface of the buffer layer 6.

When a voltage is applied between the signal electrode 3 and the ground electrode 5 in the optical device, an electric field is generated in the surface region of the LN substrate 1. In this case, a strong electric field is generated in a direction along the surface of the LN substrate 1, since the LN substrate 1 is a X-cut LN substrate. Thus, as depicted in FIG. 2, when, for example, an electric field is generated in a +Z direction in the optical waveguide WGa, an electric field is generated in a −Z direction in the optical waveguide WGb. Accordingly, the directions of the electric fields generated in the optical waveguides WGa and WGb are opposite to each other. These electric fields respectively change the refractive indexes (or optical path lengths) of the optical waveguides WGa and WGb and respectively change the phases of light to be output from the optical waveguides. Thus, desired modulated optical signals can be generated by appropriately adjusting the phases of light propagating through the Mach-Zehnder interferometers by using electric signals.

An optical modulator formed using a X-cut LN substrate is described in, for example, Japanese Laid-open Patent Publication No. 2004-133311. International Publication Pamphlet No. WO 2012/124830 describes an example of an optical modulator element.

In recent years, an electric signal having a bandwidth of several tens of GHz is applied to a signal electrode in order to implement large capacity data communication. A coplanar structure may be used to attain preferable transmission characteristics for an electric signal having such a wide bandwidth.

In the example depicted in FIG. 2, the optical waveguides WGa and WGb having a coplanar structure are formed by diffusing a metal such as titanium from the surface of the LN substrate 1. However, in this structure, it is difficult to sufficiently confine light within the optical waveguide, so the efficiency of application of an electric field is reduced. Thus, the amplitude of an input electric signal needs to be increased to generate an optical signal having a specified amplitude. Hence, the drive voltage of the optical modulator is increased, resulting in large power consumption of the optical modulator.

SUMMARY

According to an aspect of the embodiments, an optical device includes an optical modulator formed on a substrate. The optical device includes: a signal electrode for the optical modulator that is formed on the substrate; a ground electrode for the optical modulator that is formed on the substrate; an optical waveguide that is provided in a region between the signal electrode and the ground electrode; a first buffer region that is formed between the optical waveguide and the substrate; and second buffer regions that are formed between the optical waveguide and the signal electrode and between the optical waveguide and the ground electrode. A permittivity of the second buffer regions is higher than a permittivity of the first buffer region.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 3A:
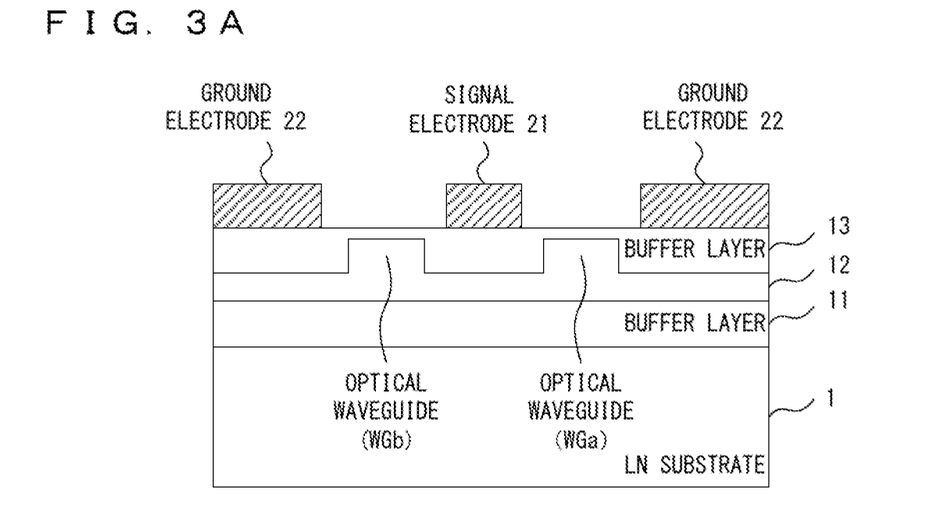
FIGS. 3A and 3B illustrate examples of optical modulators that can solve a problem caused by a structure depicted in FIG. 2.
Figure 3B:
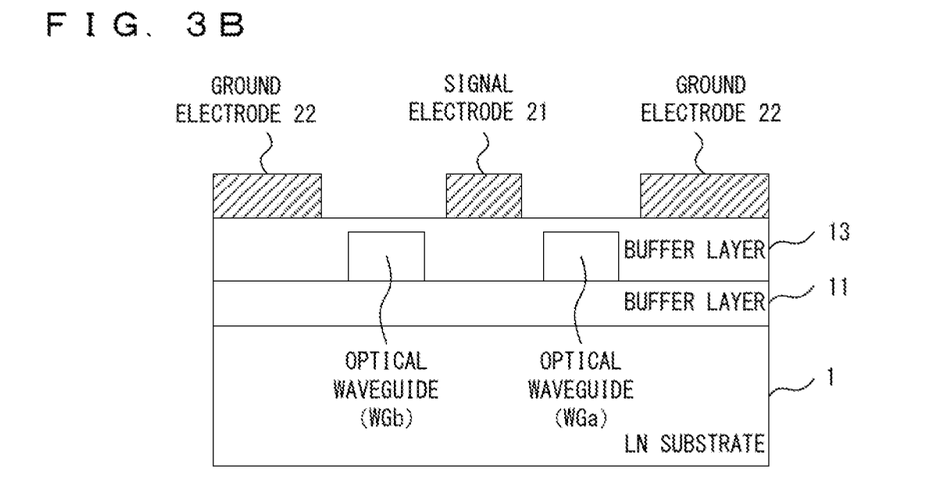

FIGS. 3A and 3B illustrate examples of optical modulators that can solve a problem caused by a structure depicted in FIG. 2. FIGS. 3A and 3B also depict any one of the four child modulators of the optical modulator depicted in FIG. 1 (i.e., any one of Mach-Zehnder interferometers XI, XQ, YI, and YQ).

In the configuration depicted in FIG. 3A, a buffer layer 11 is formed on a LN substrate 1, and a thin-film LN crystal layer 12 is formed on the buffer layer 11. Optical waveguides WGa and WGb are formed by etching the thin-film LN crystal layer 12. The optical waveguides WGa and WGb are rib waveguides and include slabs. A buffer layer 13 is formed on the upper side of the thin-film LN crystal layer 12. The buffer layers 11 and 13 may be SiO2 films. A signal electrode 21 is formed over a region between the optical waveguides WGa and WGb. Ground electrodes 22 are formed in regions outward of the optical waveguides WGa and WGb.

In this configuration, the optical waveguides WGa and WGb are surrounded by the buffer layers 11 and 13, so light will be sufficiently confined within the optical waveguides. Thus, in comparison with the configuration depicted in FIG. 2, the efficiency of conversion from an input electric signal into an optical signal is improved, and the drive voltage of the optical modulator can be decreased.

However, as described above, the optical waveguides WGa and WGb, i.e., rib waveguides, are formed by etching the thin-film LN crystal layer 12. The depth by which etching is performed needs to be precisely controlled to form the rib waveguides, so it is difficult to produce the optical modulator.

In the optical modulator depicted in FIG. 3B, channel waveguides are formed instead of the rib waveguides illustrated in FIG. 3A. In this case, optical waveguides WGa and WGb are formed by etching away thin-film LN crystal surrounding the optical waveguides WGa and WGb. Thus, the depth by which etching is performed does not need to be precisely controlled, so the production of the optical modulator is relatively easy.

However, in this configuration, a buffer layer 13 provided in a region between electrodes 21 and 22 and the optical waveguides WGa and WGb is formed from, for example, SiO2, as with the buffer layer 11. The effective refractive index of the optical waveguides WGa and WGb formed from LN crystal is different from that of the buffer layer 13 formed from SiO2. Specifically, the effective refractive index of LN crystal is about 2.2, and the effective refractive index of SiO2 is about 1.5. The propagation velocity of electromagnetic waves is dependent on an effective refractive index. Thus, the velocity of light propagating through the optical waveguide WGa or WGb does not match the velocity of electromagnetic waves propagating through the buffer layer 13. In particular, the velocity of electromagnetic waves propagating through the buffer layer 13 is higher than the velocity of light propagating through the optical waveguide WGa or WGb.

Figure 4:
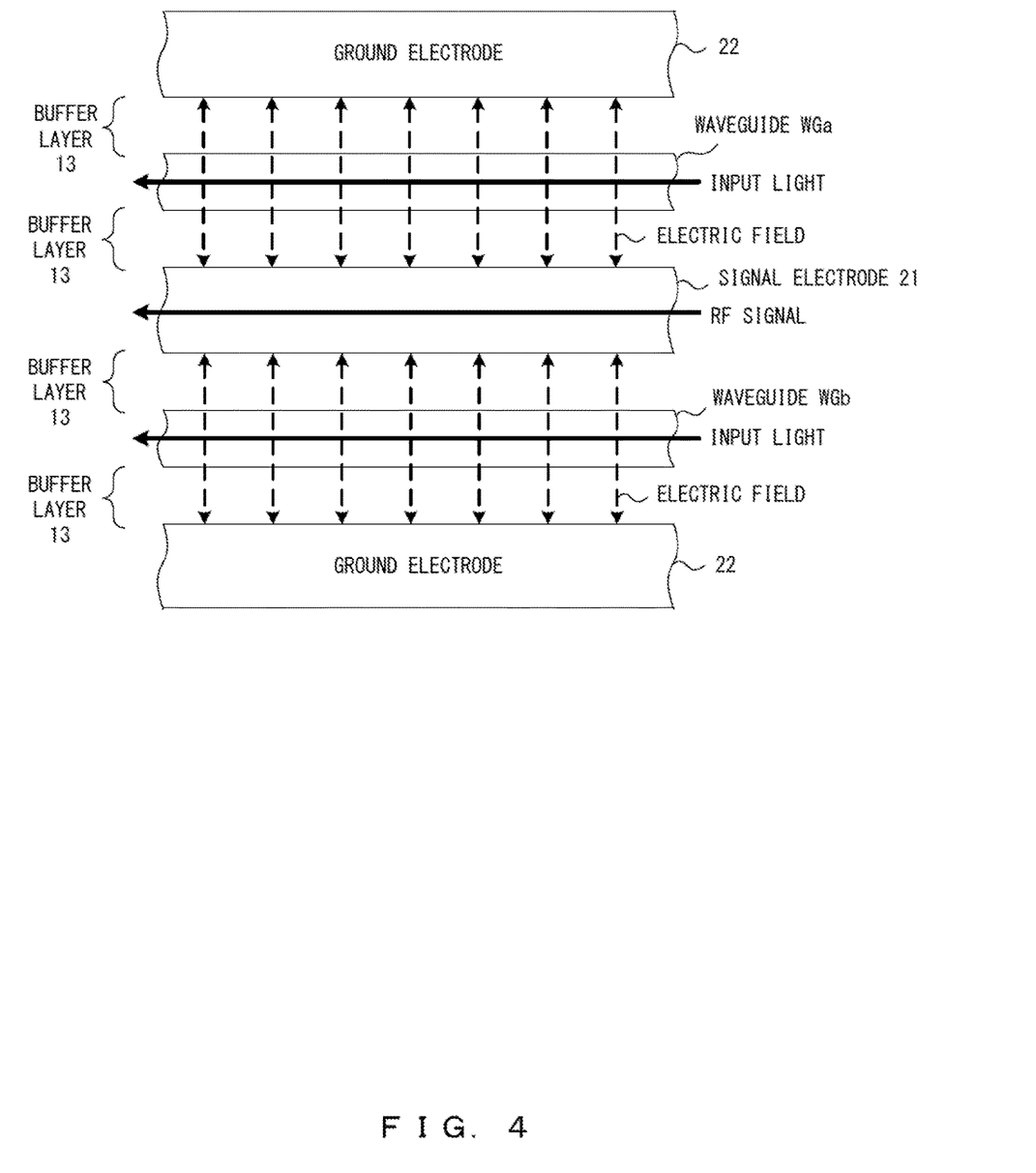
FIG. 4 is an explanatory diagram for propagation of light and a signal.

FIG. 4 is an explanatory diagram for propagation of light and a signal. In this example, light propagates through a pair of optical waveguides WGa and WGb forming a Mach-Zehnder interferometer. A signal electrode 21 is formed in a region between the optical waveguides WGa and WGb. Ground electrodes 22 are formed in regions outward of the optical waveguides WGa and WGb. An RF signal is supplied to the signal electrode 21. The RF signal indicates transmission data. The direction of propagation of light is the same as that of the RF signal.

When the RF signal is supplied to the signal electrode 21, an electric field caused by the RF signal is generated between the signal electrode 21 and the ground electrodes 22. The electric field passes through the optical waveguides WGa and WGb. A change in the electric field propagates in accordance with the propagation of the RF signal. The direction in which the change in the electric field propagates is the same as the direction in which the RF signal propagates.

However, in a configuration in which the buffer layer 13 is formed in the region between the electrodes 21 and 22 and the optical waveguides WGa and WGb as depicted in FIG. 3B, the velocity of light propagating through the optical waveguide WGa and WGb will not match the velocity of electromagnetic waves propagating through the buffer layer 13. For example, when the effective refractive index of the buffer layer 13 is lower than that of the optical waveguides WGa and WGb, the velocity of electromagnetic waves propagating through the buffer layer 13 is higher than that of light propagating through the optical waveguides WGa and WGb. When the velocity of light propagating through the optical waveguides WGa and WGa does not match that of electromagnetic waves propagating through the buffer layer 13, an input RF signal needs to have a larger amplitude in order to attain a specified optical amplitude. Thus, the drive voltage of the optical modulator needs to be increased.

EMBODIMENTS

Figure 5:
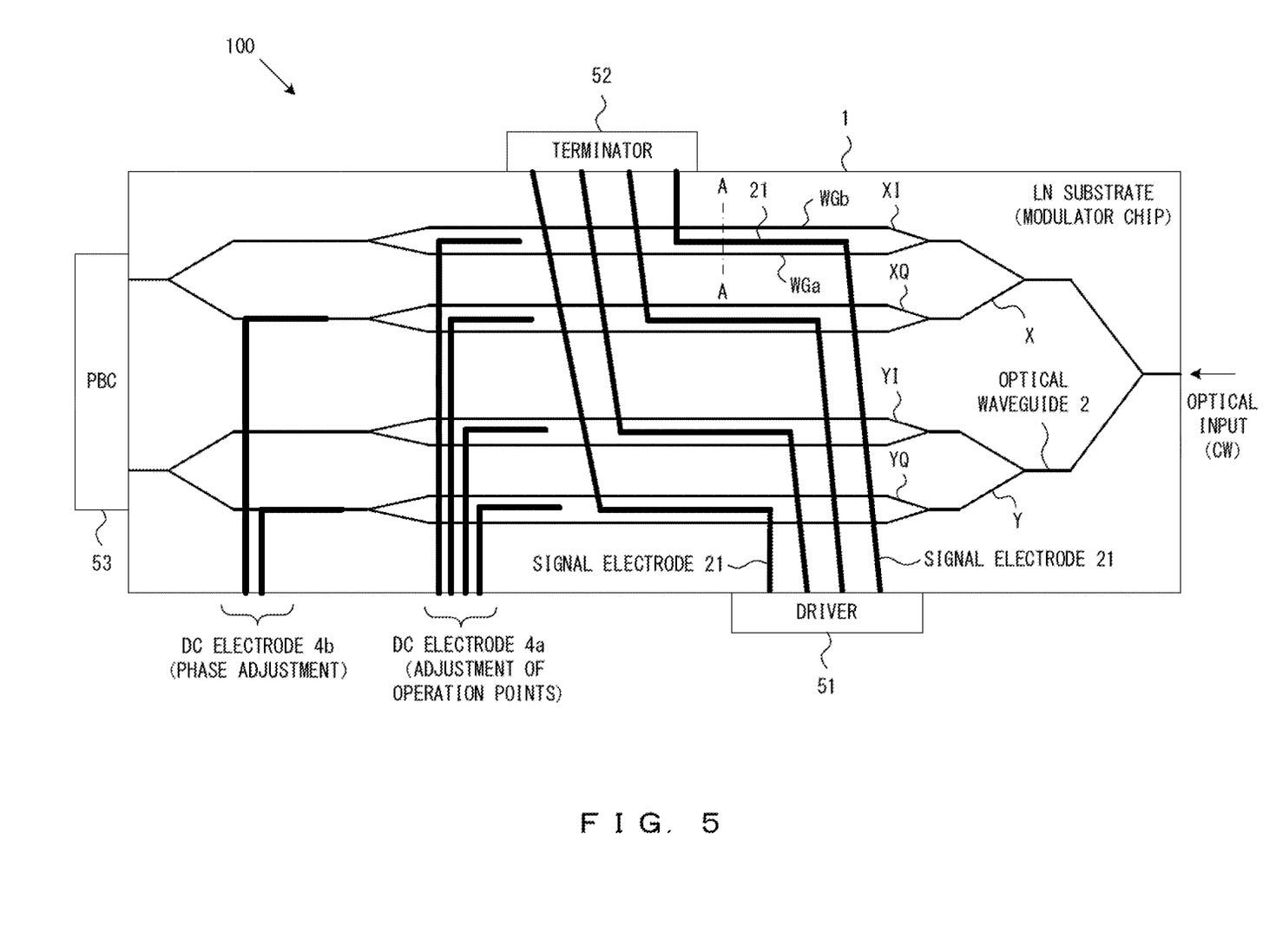
FIG. 5 illustrates an example of an optical device that includes an optical modulator in accordance with embodiments of the present invention.

FIG. 5 illustrates an example of an optical device that includes an optical modulator in accordance with embodiments of the present invention. An optical modulator 100 in accordance with embodiments of the present invention is substantially the same as the optical modulator depicted in FIG. 1. Thus, the optical modulator 100 includes a pair of parent Mach-Zehnder interferometers X and Y for generating a polarization multiplexed optical signal. Each of the parent Mach-Zehnder interferometers X and Y includes a pair of Mach-Zehnder interferometers. Accordingly, the optical modulator 100 includes four Mach-Zehnder interferometers XI, XQ, YI, and YQ. Each of the Mach-Zehnder interferometers XI, XQ, YI, and YQ may be operated as an optical modulator when an electric signal is supplied.

The optical modulator 100 is formed on a LN substrate 1. In this regard, each of the Mach-Zehnder interferometers is configured by forming optical waveguides within a surface region of the LN substrate 1. The LN substrate 1 may be, but is not particularly limited to, a X-cut LN substrate.

The optical modulator 100 includes signal electrodes 21, DC electrodes 4a and 4b, and ground electrodes. The signal electrode 21 is provided for each of the Mach-Zehnder interferometers XI, XQ, YI, and YQ. Each of the signal electrodes 21 is supplied with an RF signal indicating transmission data. RF signals are generated by a digital signal processor (not illustrated), supplied to corresponding signal electrodes 21 via a driver 51, and terminated by a terminator 52.

A DC electrode 4a is provided for each of the Mach-Zehnder interferometers XI, XQ, YI, and YQ. A DC voltage for adjusting operation points of the Mach-Zehnder interferometers XI, XQ, YI, and YQ is applied to the DC electrodes 4a. The DC electrode 4b is provided for each of the parent Mach-Zehnder interferometers X and Y. A DC voltage for adjusting a phase difference is applied to the DC electrodes 4b. For example, a DC voltage for adjusting a phase difference between the Mach-Zehnder interferometers XI and XQ may be applied to the DC electrode 4b for the parent Mach-Zehnder interferometer X, and a DC voltage for adjusting a phase difference between the Mach-Zehnder interferometers YI and YQ may be applied to the DC electrode 4b for the parent Mach-Zehnder interferometer Y. For example, the phase differences may be π/2.

The ground electrodes are formed within regions on the surface of the LN substrate 1 where neither the signal electrodes 21 nor the DC electrodes 4a and 4b are formed. The ground electrodes are electrically connected to a GND. Note that the ground electrode is omitted in FIG. 5 for visibility.

In the optical modulator 100, electric signals are respectively supplied to the Mach-Zehnder interferometers XI, XQ, YI, and YQ. In response to this, the Mach-Zehnder interferometers XI, XQ, YI, and YQ respectively output modulated optical signals XI, XQ, YI, and YQ. A modulated optical signal X is generated from the modulated optical signals XI and XQ, and a modulated optical signal Y is generated from the modulated optical signals YI and YQ. A polarization beam combiner (PBC) 53 combines and outputs the modulated optical signals X and Y.

Figure 6:
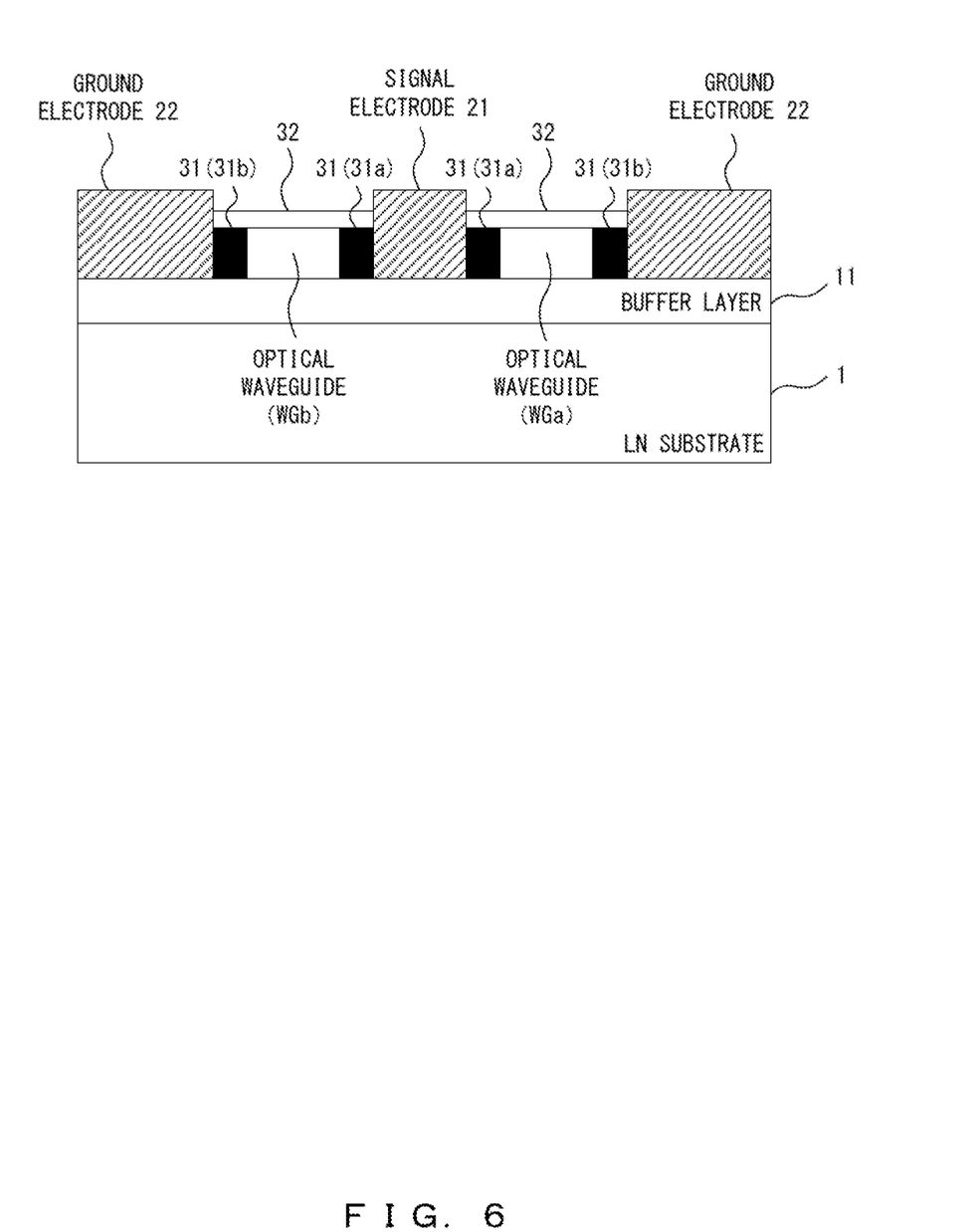
FIG. 6 illustrates an example of a cross section structure of an optical modulator in accordance with embodiments of the present invention.

FIG. 6 illustrates an example of a cross section structure of the optical modulator 100 in accordance with embodiments of the present invention. FIG. 6 depicts any one of the four child modulators of the optical modulator 100 illustrated in FIG. 5 (i.e., any one of Mach-Zehnder interferometers XI, XQ, YI, and YQ). For example, FIG. 6 may indicate an A-A cross section of the child modulator XI illustrated in FIG. 5.

A buffer layer 11 is formed on the surface of the LN substrate 1. The buffer layer 11 may be, but is not particularly limited to, an oxide film. In this example, the oxide film is SiO2.

The optical waveguides WGa and WGb are formed on the surface of the buffer layer 11. In this example, the optical waveguides WGa and WGb are formed from LN crystal, as with the LN substrate 1. For example, thin-film X-cut LN crystal may be formed on the surface of the buffer layer 11. Then, the optical waveguides WGa and WGb are formed by selectively removing the thin-film X-cut LN crystal by etching or the like. For example, each of the optical waveguides WGa and WGb may be 2-3 μm in height and 1-4 μm in width.

Buffer regions 31 are formed on side portions of each of the optical waveguides WGa and WGb. The height of the buffer regions 31 are equal to that of the optical waveguides WGa and WGb. For example, the buffer regions 31 may be 1-5 μm in width.

Buffer regions 32 are formed on the upper sides of the optical waveguides WGa and WGb and the buffer regions 31. For example, the buffer region 32 may be formed from the same material as the buffer layer 11. That is, the buffer region 32 may also be formed from SiO2.

As described above, each of the optical waveguides WGa and WGb is surrounded by the buffer layer 11, the buffer regions 31, and the buffer region 32. In this regard, the refractive index of the optical waveguides WGa and WGb is higher than those of the buffers 11, 31, and 32. Accordingly, the optical waveguides WGa and WGb function as cores, and the buffers 11, 31, and 32 function as claddings.

The buffer region 31 is formed from a different material from the buffer layer 11. In particular, the permittivity of the buffer region 31 is different from that of the buffer layer 11. In this example, the permittivity of the buffer region 31 is higher than that of the buffer layer 11.

The permittivity of the buffer regions 31 is determined to be close to the permittivity of the optical waveguides WGa and WGb in comparison with the buffer layer 11. For example, when the buffer layer 11 is formed from SiO2, the relative permittivity of the buffer layer 11 may be 4-6. Assume, for example, that the relative permittivity of the LN crystal forming the optical waveguides WGa and WGb is 30. In this case, the buffer regions 31 are formed to have a relative permittivity that is higher than the permittivity of SiO2 and close to 30.

For example, the buffer region 31 may be formed from a material obtained by mixing SiO2 with a substance having a higher permittivity than SiO2. In this case, the buffer region 31 may be formed from a material obtained by mixing SiO2 with TiO2. The relative permittivity of TiO2 is about 50-80. Thus, the relative permittivity of the buffer region 31 can be determined to a desired value by adjusting the mixing ratio between SiO2 and TiO2.

The signal electrode 21 is provided in a region between the optical waveguides WGa and WGb. The ground electrodes 22 are formed in regions outward of the optical waveguides WGa and WGb. Thus, each of the optical waveguides WGa and WGb is disposed in a region between the signal electrode 21 and a ground electrode 22. A buffer region 31 is provided between the signal electrode 21 and each of the optical waveguides WGa and WGb. Likewise, a buffer region 31 is provided between the ground electrodes 22 and each of the optical waveguides WGa and WGb. In other words, a buffer region 31a is formed on one side of each of the optical waveguides WGa and WGb, and the signal electrode 21 is formed so as to be connected to the buffer regions 31*a*. A buffer region 31*b* is formed on another side of each of the optical waveguides WGa and WGb, and the ground electrodes 22 are formed so as to be connected to the buffer regions 31*b*.

As described above, each of the optical waveguides WGa and WGb is disposed between the signal electrode 21 and a ground electrode 22. The buffer regions 31 are provided in the regions between the electrodes (21 and 22) and the optical waveguides (WGa and WGb). In this example, the optical waveguides are formed from thin-film X-cut LN crystal. Thus, when a voltage is supplied between the signal electrode 21 and the ground electrode 22, a strong electric field will be generated within the optical waveguide in a direction substantially parallel to the surface of the LN substrate 1.

The permittivity of the buffer regions 31 is close to the permittivity of the optical waveguides WGa and WGb. In particular, the permittivity of the buffer regions 31 is determined such that the velocity of light propagating through the optical waveguides WGa and WGb matches or is approximate to the velocity of electromagnetic waves propagating through the buffer regions 31. Hence, the velocity of light propagating through the optical waveguides WGa and WGb matches or is approximate to the velocity of electromagnetic waves propagating through the buffer layers 31. As a result, the amplitude of an input RF signal required for attaining a specified optical amplitude can be decreased in comparison with the configurations depicted in FIGS. 3A and 3B. Thus, the drive voltage of the optical modulator can be decreased so that power consumption of the optical modulator can be reduced.

In embodiments of the present invention, the "buffer layers" indicated in FIG. 4 correspond to the buffer regions 31. Here, increasing the permittivity of the buffer region 31 increases an effective refractive index of the buffer region 31 for microwaves, so that the velocity of microwaves propagating through the buffer region 31 can be close to the velocity of light propagating through the optical waveguide.

Figure 7:
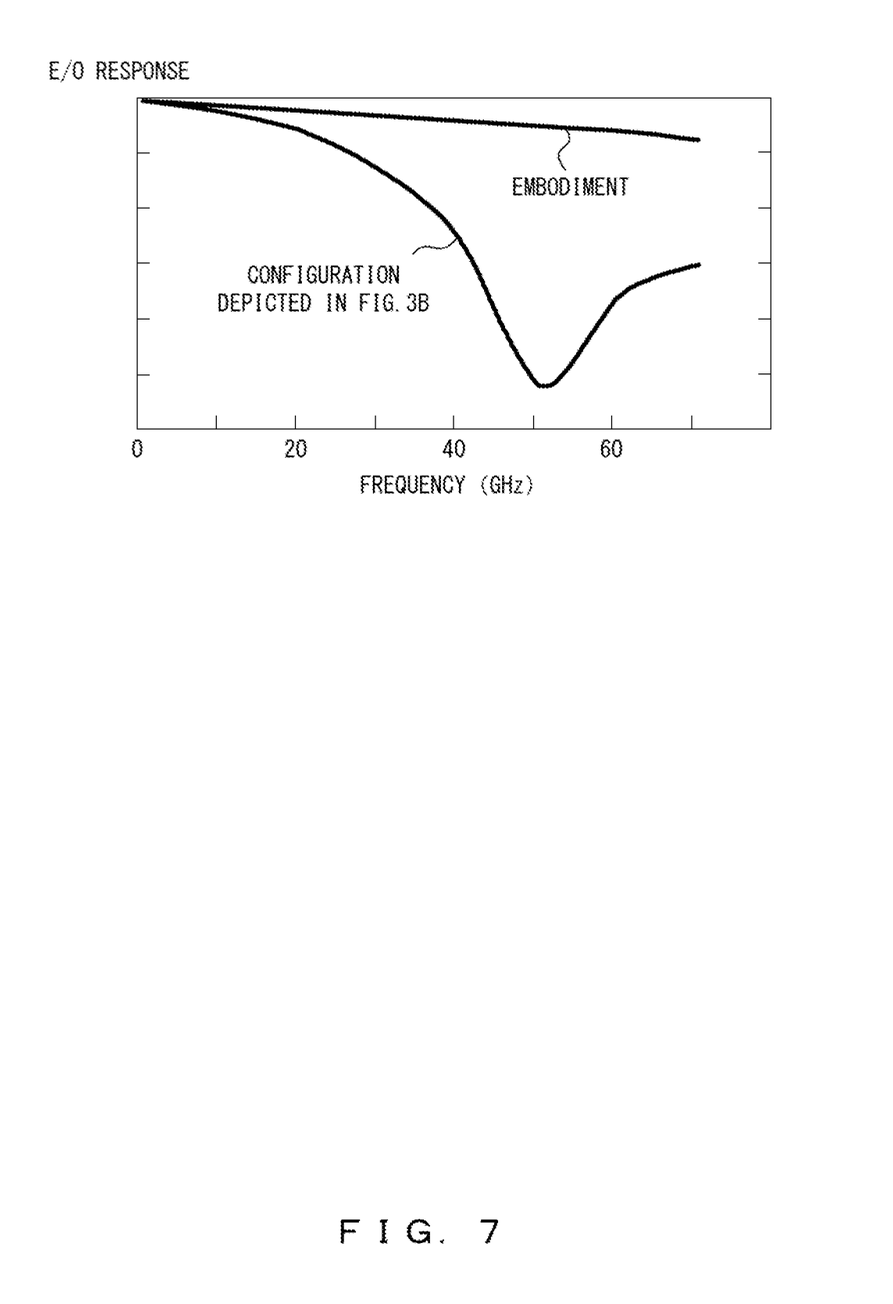
FIG. 7 illustrates one effect attained in accordance with embodiments of the present invention.

FIG. 7 illustrates one effect attained in accordance with embodiments of the present invention. The horizontal axis of the graph indicates the frequency of an RF signal for driving an optical modulator. The vertical axis indicates an E/O response. The E/O response indicates the intensity or amplitude of an output optical signal with respect to the amplitude of an input electric signal (in this example, an RF signal).

In the optical modulator depicted in FIG. 3B, the E/O response deteriorates when the frequency of an RF signal is high. In the example depicted in FIG. 7, the E/O response sharply deteriorates when the frequency of an RF signal exceeds 30 GHz. By contrast, in embodiments of the present invention, the deterioration of an E/O response is gentle even when the frequency of an RF signal is high. Thus, in embodiments of the present invention, the drive voltage of an input RF signal required for attaining a specified optical amplitude can be decreased in comparison with the configuration depicted in FIG. 3B. This effect is prominent especially when the frequency of an RF signal (i.e., the bit rate of transmission data) is high.

As described above, in embodiments of the present invention, the permittivity of the buffer regions 31 is higher than that of the buffer layer 11, so the velocity of light propagating through the optical waveguides WGa and WGb matches or is approximate to the velocity of electromagnetic waves propagating through the buffer regions 31. In this regard, the difference between the propagation velocity of electromagnetic waves through the buffer regions 31 and the propagation velocity of light through the optical waveguides WGa and WGb is smaller than the difference between the propagation velocity of electromagnetic waves through the buffer layer 11 and the propagation velocity of light through the optical waveguides WGa and WGb. Thus, the drive voltage of an input RF signal required for attaining a specified optical amplitude can be decreased. As a result, power consumption of the optical modulator is reduced. Alternatively, on the assumption that the drive voltage of the optical modulator in the configuration depicted in FIG. 3B and that in embodiments of the present invention are the same, the length of the signal electrode formed along the optical waveguides can be decreased in comparison with the configuration depicted in FIG. 3B. In this case, the size of the optical device can be decreased.

Note that increasing the permittivity of the buffer region 31 may improve the E/O response indicated in FIG. 7. However, excessively increasing the permittivity of the buffer region 31 will worsen the E/O response. Thus, the permittivity of the buffer region 31 is preferably determined to an appropriate value such that the E/O response is enhanced.

In addition, as a general rule, in order to sufficiently confine light within the optical waveguides WGa and WGb, the refractive index of the optical waveguides WGa and WGb is preferably sufficiently higher than the refractive index of the buffer regions surrounding the optical waveguides WGa and WGb. Thus, a material for the buffer regions 31 is preferably determined such that light is sufficiently confined within the optical waveguides WGa and WGb. However, it is considered that the E/O response will deteriorate if light cannot be sufficiently confined within the optical waveguides WGa and WGb. Thus, determining a material for the buffer regions 31 so as to enhance the E/O response (preferably, optimize the E/O response) will allow the drive voltage of an input RF signal required to attain a specified optical amplitude to be decreased.

Figure 8:
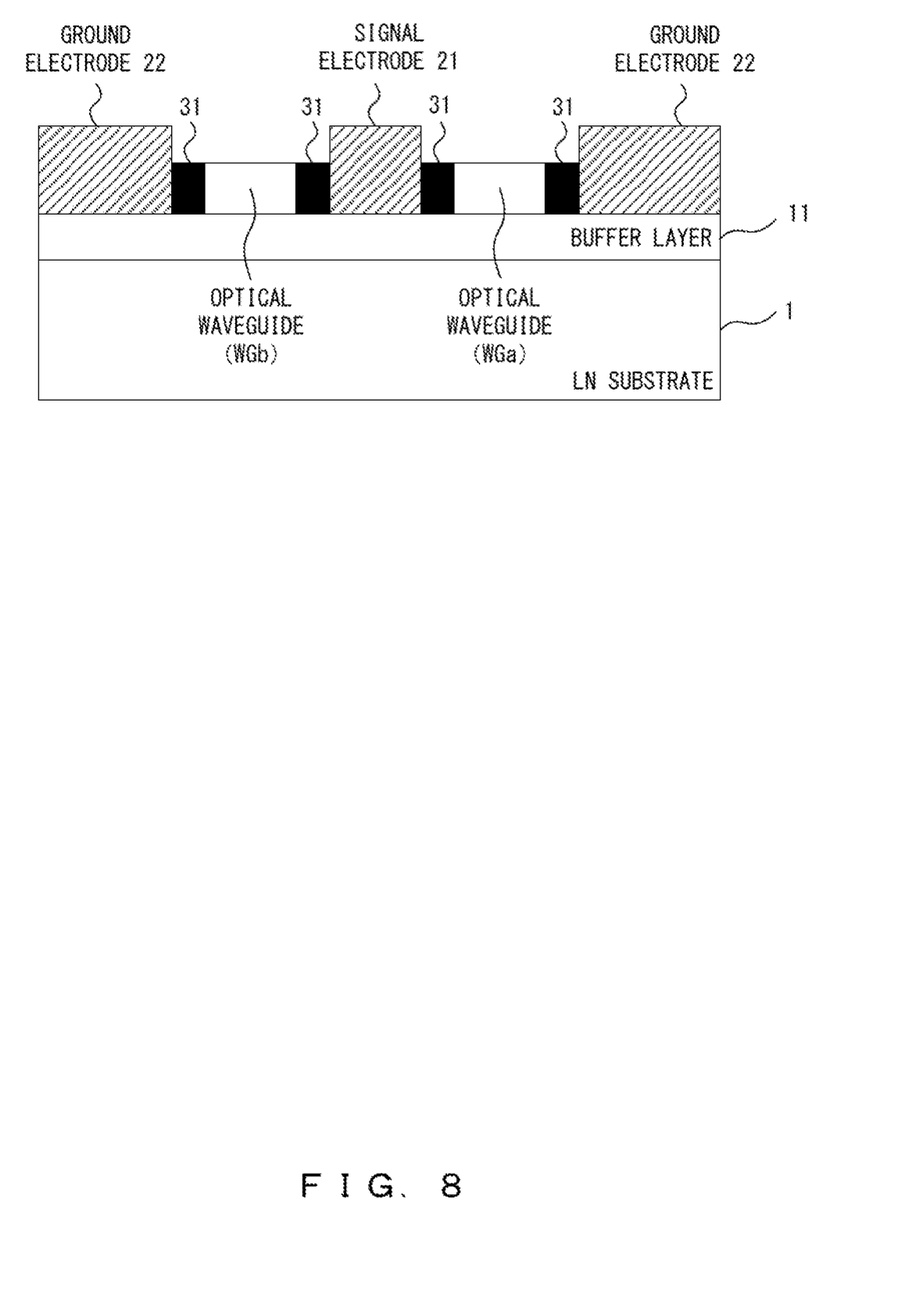
FIG. 8 illustrates a variation of an optical modulator in accordance with embodiments of the present invention.

FIG. 8 illustrates a variation of an optical modulator in accordance with embodiments of the present invention. In comparison with the configuration depicted in FIG. 6, the buffer region 32 is not provided in the configuration illustrated in FIG. 8. This means that the buffer region 32 depicted in FIG. 6 does not need to be provided, as long as velocity matching can be attained between light and microwaves without providing a buffer layer on the upper side of the optical waveguides WGa and WGb.

The process for providing the buffer region 32 is unnecessary in the configuration depicted in FIG. 8, so the method for producing the optical modulator can be simplified in comparison with the configuration illustrated in FIG. 6. However, light scattering may occur since the surfaces of the optical waveguides WGa and WGb are not protected by a buffer layer.

Figure 9A:
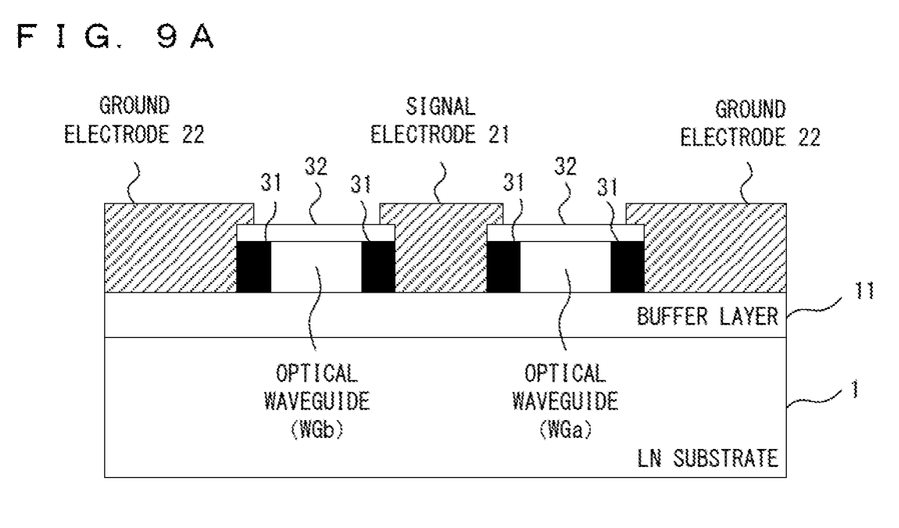
FIGS. 9A and 9B illustrate other variations of an optical modulator in accordance embodiments of the present invention.
Figure 9B:
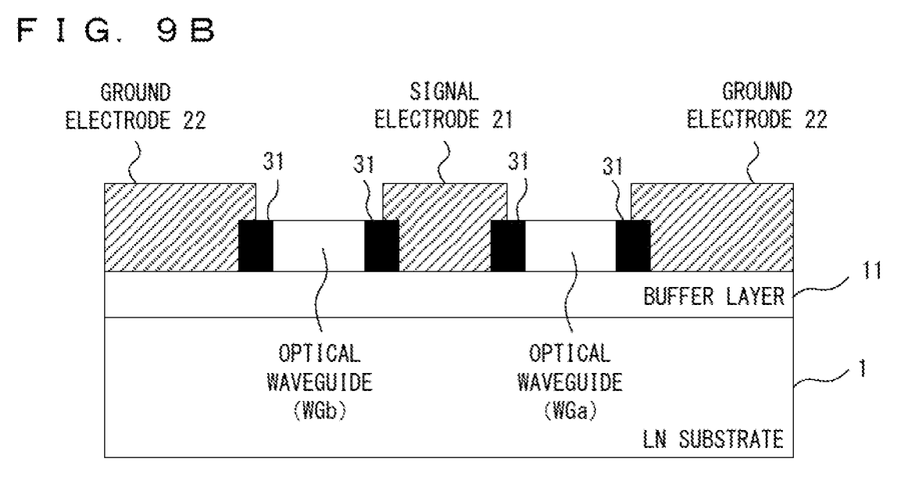

FIGS. 9A and 9B illustrate other variations of an optical modulator in accordance embodiments of the present invention. FIG. 9A depicts a variation of the configuration illustrated in FIG. 6. FIG. 9B depicts a variation of the configuration illustrated in FIG. 8.

In the configurations depicted in FIGS. 6 and 8, the positions of edges of the buffer regions 31 respectively match the positions of edge of the electrodes (21, 22). In these configurations, there may be a gap between a buffer region 31 and an electrode (21, 22) due to a production error or the like. Here, the gap between a buffer region 31 and an electrode (21, 22) may reduce the efficiency of a conversion from an electric signal to an optical signal, thereby increasing the drive voltage of an input RF signal required to attain a specified optical amplitude.

In the configurations depicted in FIGS. 9A and 9B, portions of the signal electrode 21 overlap portions of corresponding buffer regions 31, and portions of the ground electrodes 22 overlap portions of corresponding buffer regions 31. In this situation, even in the case of, for example, a production error in which the width of a buffer region 31 is less than a design value or a production error in which the distance between the signal electrode 21 and a ground electrode 22 is greater than a design value, a gap will be unlikely to be formed between the buffer region 31 and an electrode (21, 22). Thus, since the efficiency of a conversion from an electric signal to an optical signal is not reduced, an increase in the drive voltage of an input RF signal required to attain a specified optical amplitude is suppressed. Note that the process of forming the signal electrode 21 and the ground electrode 22 preferably includes a process of depositing a metal such as Ti on side surfaces of the buffer regions 31.

Figure 10:
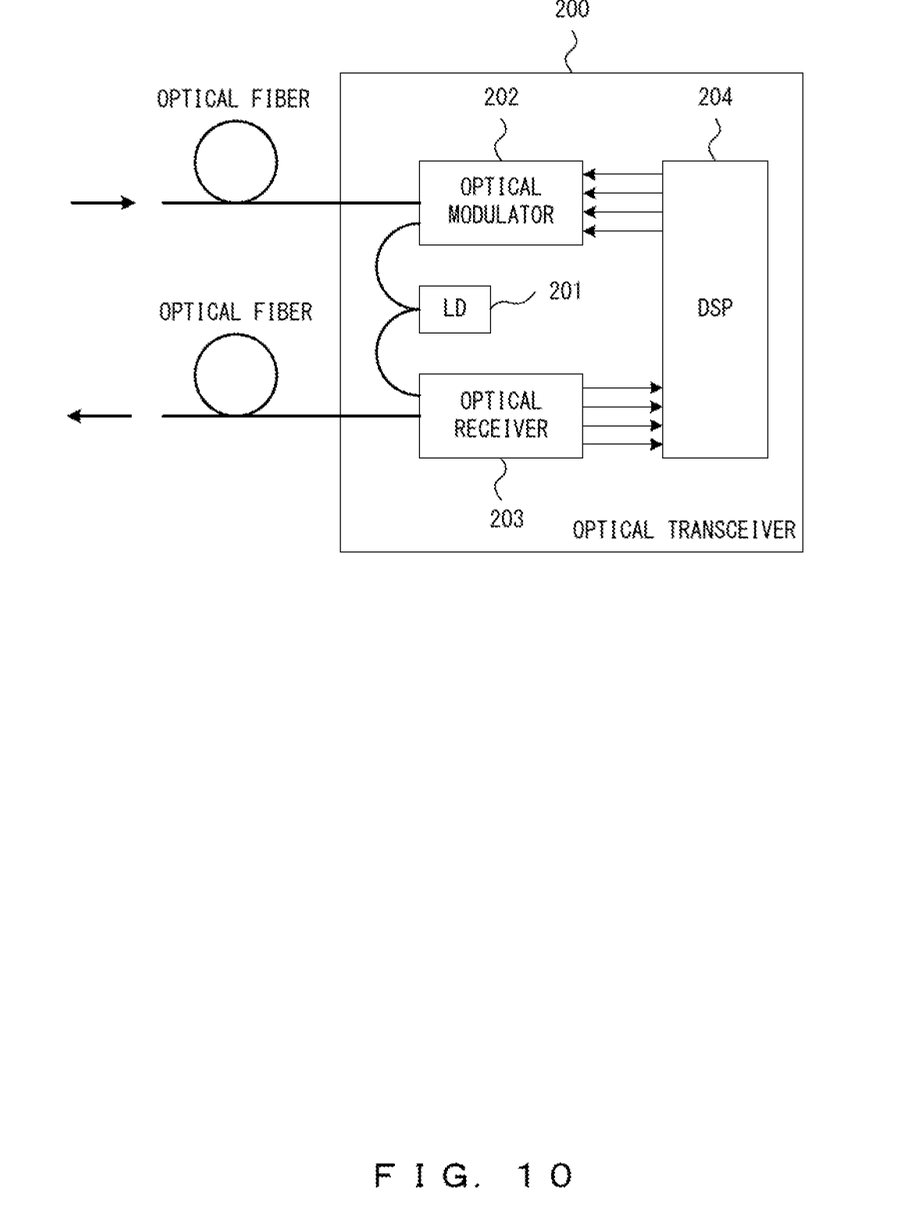
FIG. 10 illustrates an example of an optical transceiver in accordance with embodiments of the present invention.

FIG. 10 illustrates an example of an optical transceiver in accordance with embodiments of the present invention. An optical transceiver 200 includes a light source (LD) 201, an optical modulator 202, an optical receiver 203, and a digital signal processor (DSP) 204.

The light source 201 is, for example, a laser light source and generates continuous wave light of a specified frequency. The optical modulator 202 generates a modulated optical signal by modulating the continuous wave light generated by the light source 201 with a transmission signal supplied from the DSP 204. The optical modulator 202 may correspond to the optical modulator 100 depicted in FIG. 5. The optical receiver 203 is, for example, a coherent receiver and demodulates a received optical signal by using the continuous wave light generated by the light source 201. The DSP 204 generates a transmission signal from data supplied from an application. The transmission signal is supplied to the optical modulator 202. The DSP 204 recovers data from a received signal demodulated by the optical receiver 203.

Accordingly, the optical transceiver 200 includes the optical device in accordance with embodiments of the present invention as an optical modulator. Thus, both a reduction in power consumption of the optical transceiver and downsizing of the optical transceiver can be attained.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical device that includes an optical modulator formed on a substrate, the optical device comprising:
   a first buffer region that is formed on a first surface of the substrate;
   a signal electrode for the optical modulator that is formed on the first buffer region;
   a ground electrode for the optical modulator that is formed on the first buffer region;
   an optical waveguide that is formed on the first buffer region and arranged in a region between the signal electrode and the ground electrode;
   a second buffer region that is formed on the first buffer region; and
   a third buffer region that is formed on the first buffer region, wherein
   the second buffer region is arranged between the optical waveguide and the signal electrode and contacts both of the optical waveguide and the signal electrode,
   the third buffer region is arranged between the optical waveguide and the ground electrode and contacts both of the optical waveguide and the ground electrode,
   the second buffer region is separate from the third buffer region, and
   a permittivity of the second buffer region and the third buffer region is higher than a permittivity of the first buffer region.

2. The optical device according to claim 1, wherein the optical waveguide is formed from thin-film X-cut LN crystal.

3. The optical device according to claim 1, wherein the first buffer region is formed from SiO2, and the second buffer and the third buffer region are formed from a material containing SiO2 and a substance having a higher permittivity than SiO2.

4. The optical device according to claim 1, wherein a difference between a propagation velocity of an electromagnetic wave through the second buffer and the third buffer region and a propagation velocity of light through the optical waveguide is smaller than a difference between a propagation velocity of an electromagnetic wave through the first buffer region and the propagation velocity of light through the optical waveguides.

5. The optical device according to claim 1, wherein a portion of the signal electrode and a portion of the ground electrode are respectively formed to overlap the second buffer regions.

6. An optical device that includes an optical modulator formed on a substrate, the optical device comprising:
   a signal electrode for the optical modulator that is formed on the substrate;
   a ground electrode for the optical modulator that is formed on the substrate;
   an optical waveguide that is arranged in a region between the signal electrode and the ground electrode;
   a first buffer region that is arranged between the optical waveguide and the substrate;
   second buffer regions that are arranged between the optical waveguide and the signal electrode and between the optical waveguide and the ground electrode; and
   a third buffer region that is formed from the same material as the first buffer region and arranged on an upper side of the optical waveguide, wherein
   a permittivity of the second buffer regions is higher than a permittivity of the first buffer region.

7. The optical device according to claim 6, wherein a portion of the signal electrode and a portion of the ground electrode are respectively formed on an upper surface of the third buffer region so as to overlap the second buffer regions.

8. An optical transceiver comprising an optical modulator and an optical receiver,
   wherein the optical modulator includes
   a substrate,
   a first buffer region that is formed on a first surface of the substrate;
   a signal electrode for the optical modulator that is formed on the first buffer region, a ground electrode for the optical modulator that is formed on the first buffer region, an optical waveguide that is formed on the first buffer region and arranged in a region between the signal electrode and the ground electrode, a second buffer region that is formed on the first buffer region, and a third buffer region that is formed on the first buffer region, wherein the second buffer region is arranged between the optical waveguide and the signal electrode and contacts both of the optical waveguide and the signal electrode, wherein the third buffer region is arranged between the optical waveguide and the ground electrode and contacts both of the optical waveguide and the ground electrode, wherein the second buffer region is separate from the third buffer region, and wherein a permittivity of the second buffer region and the third buffer region is higher than a permittivity of the first buffer region.

\* \* \* \* \*